(12) United States Patent
Wong et al.

(10) Patent No.: US 11,750,349 B2
(45) Date of Patent: *Sep. 5, 2023

(54) TELECOMMUNICATIONS APPARATUS AND METHODS

(71) Applicants: Sony Group Corporation, Tokyo (JP); Sony Semiconductor Solutions Corporation, Kanagawa (JP); SONY SEMICONDUCTOR ISRAEL LTD., Hod Hasharon (IL)

(72) Inventors: Shin Horng Wong, Basingstoke (GB); Martin Warwick Beale, Basingstoke (GB); Yigal Bitran, Hod Hasharon (IL); Lavi Semel, Hod Hasharon (IL); Hovav Elzas, Hod Hasharon (IL)

(73) Assignees: SONY GROUP CORPORATION, Tokyo (JP); SONY SEMICONDUCTOR SOLUTIONS CORPORATION, Kanagawa (JP); SONY SEMICONDUCTOR ISRAEL LTD., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,702

(22) Filed: Mar. 14, 2022

(65) Prior Publication Data
US 2022/0200765 A1 Jun. 23, 2022

Related U.S. Application Data

(63) Continuation of application No. 16/631,850, filed as application No. PCT/EP2018/071382 on Aug. 7, 2018, now Pat. No. 11,277,245.

(30) Foreign Application Priority Data

Aug. 10, 2017 (EP) .................................... 17185809

(51) Int. Cl.
*H04L 5/00* (2006.01)
*H04L 1/16* (2023.01)
(Continued)

(52) U.S. Cl.
CPC .......... *H04L 5/0053* (2013.01); *H04L 1/1671* (2013.01); *H04L 1/1809* (2013.01);
(Continued)

(58) Field of Classification Search
CPC ... H04L 5/0053; H04L 1/1671; H04L 1/1809; H04L 1/1887; H04W 72/042; H04W 72/0446; H04W 72/23
(Continued)

(56) References Cited

U.S. PATENT DOCUMENTS

2009/0052388 A1* 2/2009 Kim ................. H04W 74/0833
370/329
2019/0082412 A1 3/2019 Zander et al.
(Continued)

FOREIGN PATENT DOCUMENTS

WO 2018/172486 A1 9/2018

OTHER PUBLICATIONS

International Search Report and Written Opinion dated Oct. 11, 2018 for PCT/EP2018/071382 filed on Aug. 7, 2018, 11 pages.
(Continued)

*Primary Examiner* — Faisal Choudhury
(74) *Attorney, Agent, or Firm* — XSENSUS LLP (57) ABSTRACT

A method of operating a terminal in a wireless telecommunications system comprising the terminal and a network node, wherein the method comprises: determining there is data to be transmitted from the terminal to the network node using a series of repeat transmissions; establishing an initial arrangement of transmission resources to be used for transmitting respective ones of the repeat transmissions from the
(Continued)

terminal to the network node; starting to transmit the series of repeat transmissions to the network node using transmission resources according to the initial arrangement; establishing before the transmission of the series of repeat transmissions to the network node is complete that a modified arrangement of transmission resources should be used for transmitting at least some of the remaining repeat transmissions; and starting to transmit the at least some remaining repeat transmissions to the network node using transmission resources in accordance with the modified arrangement.

20 Claims, 5 Drawing Sheets

(51) Int. Cl.
  *H04L 1/1607* (2023.01)
  *H04L 1/1809* (2023.01)
  *H04L 1/1867* (2023.01)
  *H04W 72/0446* (2023.01)
  *H04W 72/23* (2023.01)
(52) U.S. Cl.
  CPC ....... *H04L 1/1887* (2013.01); *H04W 72/0446* (2013.01); *H04W 72/23* (2023.01)
(58) Field of Classification Search
  USPC ........................................................ 370/329
  See application file for complete search history.

(56) References Cited

U.S. PATENT DOCUMENTS

2019/0393988 A1\* 12/2019 Bae .......................... H04L 1/189
2020/0028644 A1\*  1/2020 Karjalainen ............ H04L 5/005
2020/0154400 A1\*  5/2020 Byun ........................ H04L 5/00

OTHER PUBLICATIONS

Ericsson and Qualcomm, "New WID on Even further enhanced MTC for LTE," 3GPP TSG RAN Meeting No. 75, RP-170732, Dubrovnik, Croatia, Mar. 6-9, 2017, 4 pages.
Ericsson, "Revised WID for Further Enhanced MTC for LTE," 3GPP TSG RAN Meeting No. 73, RP-161464, New Orleans, USA, Sep. 19-22, 2016, 6 pages.
Holma, H., and Toskala, A., "LTE for UMTS OFDMA and SC-FDMA based radio access," System Architecture Based on 3GPP SAE, John Wiley and Sons, Apr. 2009, pp. 25-27.
Huawei and Hisilicon, "Revised work item proposal: Enhancements of NB-IoT," 3GPP TSG RAN Meeting No. 73, RP-161901, New Orleans, USA, Sep. 19-22, 2016, 8 pages.
Huawei et al., "New WID on Further NB-IoT enhancements," 3GPP TSG RAN Meeting No. 75, RP-170852, Dubrovnik, Croatia, Mar. 6-9, 2017, 6 pages.
NTT Docomo, "Views on Remaining issues of DCI," 3GPP TSG RAN WG1 Meeting No. 83, R1-157344, Anaheim, USA, Nov. 15-22, 2015, 4 pages.

\* cited by examiner

TELECOMMUNICATIONS APPARATUS AND METHODS

CROSS-REFERENCE TO RELATED APPLICATIONS

The present application is a continuation of U.S. application Ser. No. 16/631,850, filed Jan. 17, 2020, which is based on PCT filing PCT/EP2018/071382, filed Aug. 7, 2018, which claims priority to EP 17185809.5, filed Aug. 10, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, (1), [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY

Respective aspects and features of the present disclosure are defined in the appended claims, it is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
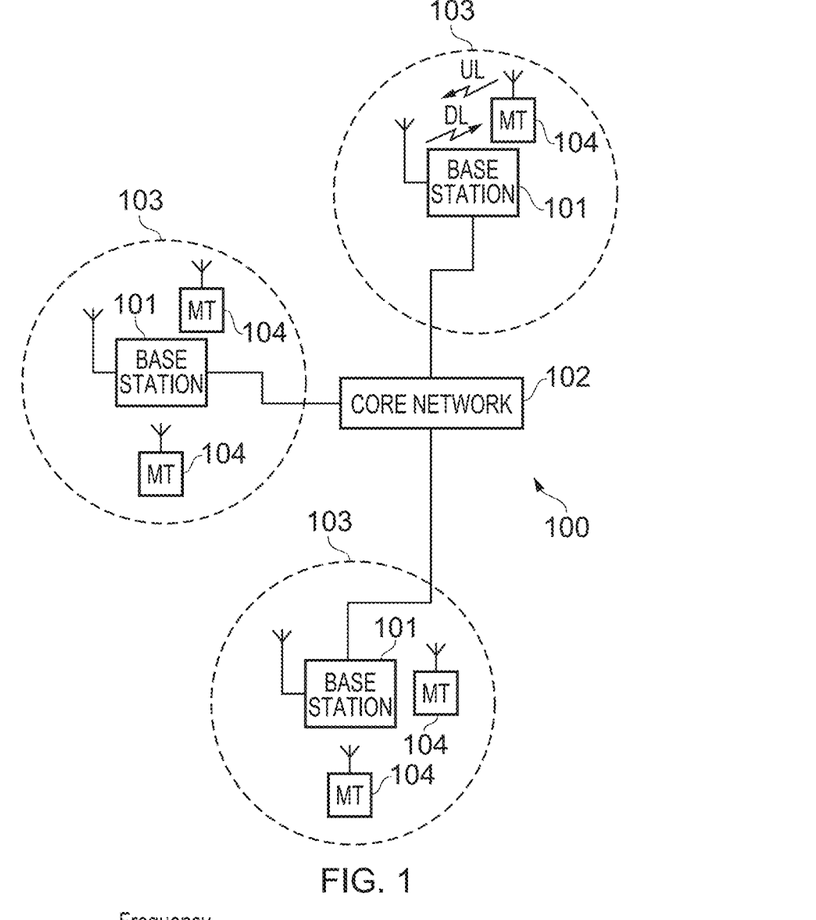
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

As noted above, one area of current interest in wireless telecommunications systems is providing coverage enhancement, for example for terminal devices in poor coverage areas, which in many cases may be Internet of Things type devices. For example, some current proposals in LTE-based wireless telecommunications systems aim to provide approaches for coverage enhancement in which coverage is extended by 15-20 dB relative to that of normal LTE coverage. One mechanism currently proposed for coverage enhancement is to make use of repetitions of physical channel transmissions. For example, in LTE a physical uplink shared channel (PUSCH) may be configured to allow up to 2048 repeat transmissions for a block of data to be transmitted from a terminal device to a network infrastructure equipment serving the terminal device. The network infrastructure equipment may then combine/aggregate signalling received for each of the repetitions to increase the likelihood of successfully decoding the relevant data even though the individual transmissions making up the series of repeat transmissions may, in themselves, be unlikely to be successfully decoded at the network infrastructure equipment due to poor coverage.

Repetition on a single frequency can be spectrally inefficient. To address this it has been proposed to use frequency hopping for the repeated transmissions, whereby the associated frequency diversity can in some cases provide a gain of 3 to 4 dB (which can allow for greater levels of coverage enhancement or the same level of coverage enhancement using less repetition as compared to single frequency approaches).

For example, in current proposals for MTC and NB-IoT operations using repeat transmissions, frequency hopping may be performed every $Y_{ch}$ repetitions, where $Y_{ch}$ may be selected from $\{1, 2, 4, 8\}$ for CE Mode A (normal to moderate coverage enhancement) and $Y_{ch}$ may be selected from $\{2, 4, 8, 16\}$ for CE Mode B (deep coverage enhancement). In one current proposal the repeating transmissions may be hopped between two frequencies in uplink and between two or four different frequencies in downlink.

Figure 2:
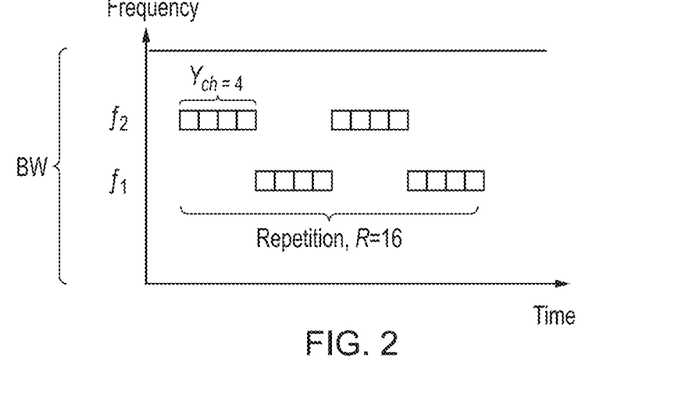
FIG. 2 schematically represents an example arrangement of radio resources in a time and frequency radio resource grid used to support transmissions of multiple repeats of a block of data to enhance coverage.

FIG. 2 schematically represents an example arrangement of radio resources allocated for uplink transmission of a series of repeats associated with the transmission of data from a terminal device in a time and frequency radio resource grid. The radio resource grid extends in time in the horizontal direction and frequency in the vertical direction and spans the uplink operating bandwidth BW for the relevant channel (e.g. PUSCH in an LTE implementation) in the wireless telecommunications system. Each separate transmission comprising the series of repeat transmissions is represented in FIG. 2 as a shaded box. In the specific example represented in FIG. 2, the series of uplink transmissions comprises 16 repeats (R=18) with frequency hopping between frequencies f2 and f1 after every four transmissions (i.e. $Y_{ch}=4$).

As noted above, frequency hopping can be used to improve spectral efficiency by reducing the likelihood of all transmissions comprising a series of repeat transmissions being affected by frequency selective poor channel conditions. To help avoid overly complex scheduling issues it is expected approaches for supporting frequency hopping of repeated transmissions may be restricted to hopping between a relatively small number of different frequencies, for example only two in current proposals for uplink. However, the inventors have recognised this approach limits the extent to which frequency hopping can address frequency selective poor channel conditions. The inventors have also recognised that a frequency hopping transmission wastes energy if it is received in a fade within a frequency selective transmission. For example, if one of the two hopping frequencies is associated with poor channel conditions, this will mean 50% of the transmissions comprising a series of repeat transmissions (which in some cases may be a significant number of transmissions) will be impacted and the energy used for those transmissions will not significantly increase the probability of successful decoding at the receiver.

Thus in accordance with certain embodiments of the disclosure a network infrastructure equipment may provide a terminal device with an allocation of radio resources arranged in an initial pattern of hopping between two frequencies in a radio resource grid (e.g. as shown in FIG. 2), and the terminal device may start transmitting repeats on the allocated radio resources, hopping between the two frequencies at the appropriate times. If the network infrastructure equipment determines channel conditions on one of the frequencies are poor, it may transmit signalling to the terminal device to indicate the terminal device should change to a different arrangement of radio resources within the radio resource grid for transmitting the remaining repeats (i.e. the repeats from the series of repeat transmissions which have yet to be transmitted). This can provide a simple mechanism for allowing a terminal device to switch away from using radio resources associated with poor channel conditions during an ongoing series of repeat transmissions. There are various ways in which the pattern of radio resources may be changed partway through the transmission of the series of repeat transmissions and some examples are discussed further below.

Figure 3:
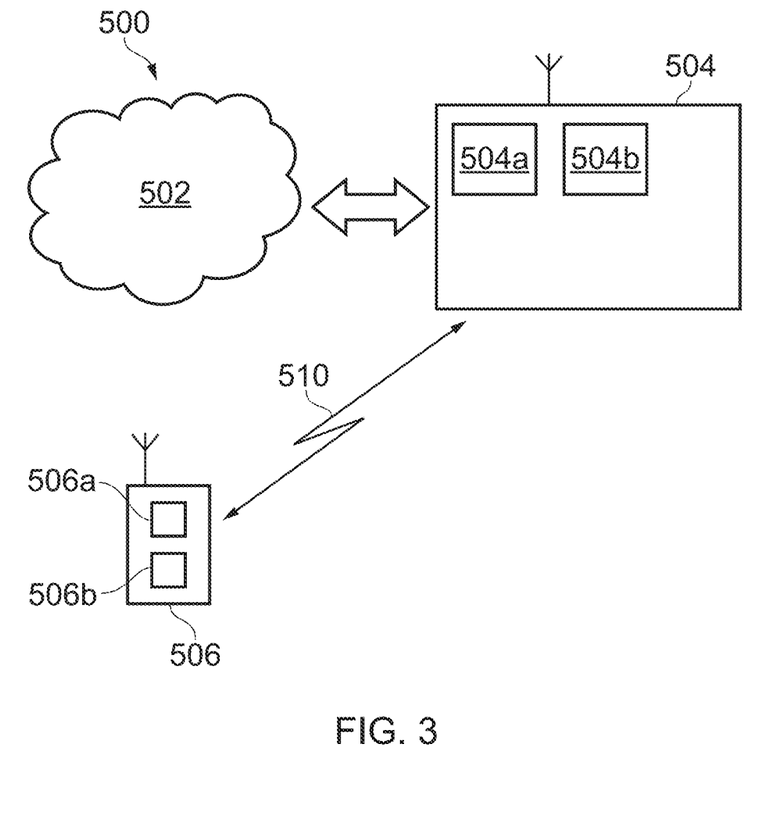
FIG. 3 schematically represents some aspects of a wireless telecommunication system in accordance with certain embodiments of the present disclosure.

FIG. 3 schematically shows some aspects of a telecommunications system 500 configured to support communications between a terminal device 506 and a network access node 504 in accordance with certain embodiments of the disclosure. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access node 504 may, for convenience, sometimes be referred to herein as a base station 504, it being understood this term is used for simplicity and is not intended to imply the network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part (evolved packet core) 502 coupled to a radio network part. The radio network part comprises the radio network access node (e.g. network access node in an LTE implementation) 504 coupled to the terminal device 506. It will of course be appreciated that in practice the radio network part may comprise a plurality of network access nodes serving a larger number of terminal devices across various communication cells. However, only a single network access node and one terminal device are shown in FIG. 3 in the interests of simplicity.

As with a conventional mobile radio network, the terminal device 506 is arranged to communicate data to and from the network access node (transceiver station/network infrastructure equipment) 504. The network access node is in turn communicatively connected to a serving gateway, S-GW, (not shown) in the core network part which is arranged to perform routing and management of mobile communications services to the terminal devices in the telecommunications system 500 via the network access node 504. In order to maintain mobility management and connectivity, the core network part 502 also includes a mobility management entity (not shown) which manages the enhanced packet service, EPS, connections with terminal devices operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 3 may be in accordance with known techniques apart from where modified to provide functionality in accordance with embodiments of the present disclosure as discussed herein.

In this example the terminal device 506 is assumed to be an MTC terminal device adapted to use uplink repeat transmissions with frequency hopping to enhance coverage as discussed further herein. The terminal device 506 may be a dedicated MTC terminal device, such as a smart meter device, or may be a generic terminal device, such as a smartphone terminal device, running an application that relies on MTC data exchange. The terminal device 506 comprises transceiver circuitry 506a (which may also be referred to as a transceiver/transceiver unit) for transmission and reception of wireless signals and processor circuitry 506b (which may also be referred to as a processor/processor unit) configured to control the terminal device 506. The processor circuitry 506b may comprise various sub-units/sub-circuits for providing desired functionality as explained further herein. These sub-units may be implemented as discrete hardware elements or as appropriately configured functions of the processor circuitry. Thus the processor circuitry 506b may comprise circuitry which is suitably configured/programmed to provide the desired functionality described herein using conventional programming/configuration techniques for equipment in wireless telecommunications systems. The transceiver circuitry 506a and the processor circuitry 506b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 506 will in general comprise various other elements associated with its operating functionality, for example a power source, user interface, and so forth, but these are not shown in FIG. 3 in the interests of simplicity.

The network access node 504 comprises transceiver circuitry 504a (which may also be referred to as a transceiver/transceiver unit) for transmission and reception of wireless signals and processor circuitry 504b (which may also be referred to as a processor/processor unit) configured to control the network access node 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the network access node 504 will in general comprise various other elements associated with its operating functionality, such as a scheduler. For example, although not shown in FIG. 3 for simplicity, the processor circuitry 504*b* may comprise scheduling circuitry, that is to say the processor circuitry 504*b* may be configured/programmed to provide the scheduling function for the network access node.

Thus, the network access node 504 is configured to communicate with the terminal device 506 over a radio communication link 510.

As noted above, for example with reference to FIG. 2, it has been proposed to transmit multiple repeats of uplink data with frequency hopping to provide coverage enhancement for a terminal device (i.e. enhanced likelihood of successful exchange of data), and certain embodiments of the disclosure are based on a modification of this approach. In particular, certain embodiments of the disclosure are based on approaches in which an initially established arrangement of radio resources in time and frequency for a terminal device to use for transmitting multiple repeats of a block of data may be dynamically modified while the transmission is ongoing (i.e. after having made some but not all of the transmissions comprising the series of repeat transmissions). This may be done, for example, in response to a determined change in radio channel conditions during transmission of the multiple repeat transmissions for a block of data. For example, in accordance with certain embodiments of the disclosure, this may involve a network element, e.g. the network infrastructure equipment receiving the transmissions, determining the arrangement/pattern of radio resources currently being used to transmit repeat transmissions of the data from the terminal device to the network infrastructure equipment should be modified based on channel condition monitoring, and transmitting an indication of this to the terminal device. For convenience of terminology, such an indication may sometimes be referred to here as a Frequency Hopping Pattern Change indicator (FHC). However, as will be understood from some of the examples described herein, the modified arrangement of radio resources to use for remaining repeat transmissions may not always result in a change in frequency, but may instead result in a change in timing. That is to say, rather than change to one or more different frequencies for remaining transmissions in the expectation these might provide better channel conditions, the terminal device may instead change to different times for remaining transmissions—i.e. by in effect pausing or skipping transmissions for a period of time to help avoid making transmissions which waste resources, e.g. energy, because they are made at times of poor channel conditions, in the expectation channel conditions may improve when transmissions are restarted. More generally, the change in frequency hopping pattern may include changes in one or other or both of time and frequency (i.e. changes in both dimensions of the time and frequency radio resource grid available for transmissions on the channel used for the transmissions).

Figure 4:
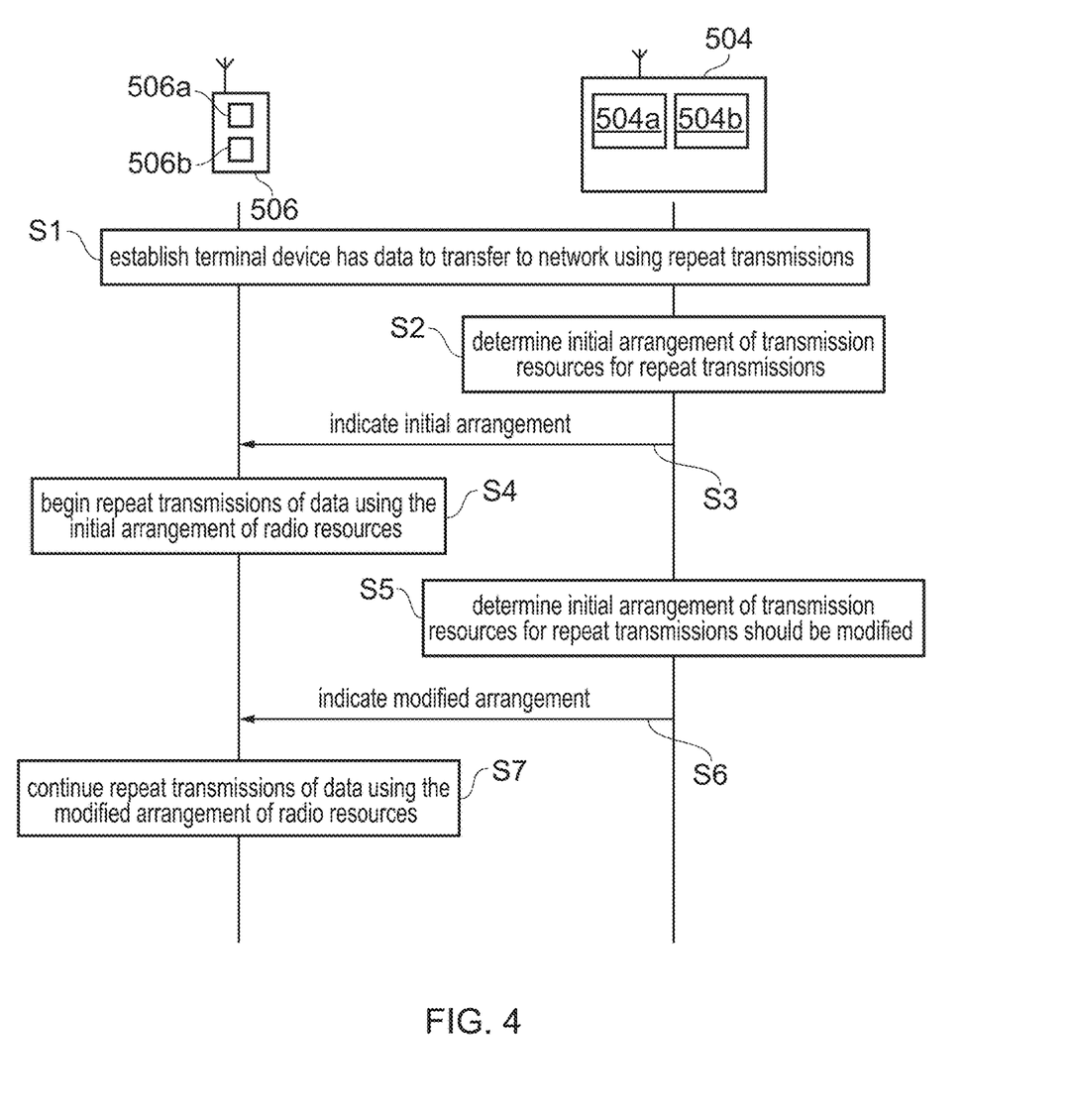
FIG. 4 is a signalling ladder diagram schematically representing some operating aspects of wireless telecommunications systems in accordance with certain embodiments of the disclosure.

FIG. 4 is a ladder diagram schematically representing some operating aspects of the wireless telecommunications system 500 as discussed above with reference to FIG. 3 in accordance with certain embodiments of the disclosure. In particular, the diagram represents some operations and signalling exchange associated with the terminal device 506 and the network access node 504 in accordance with certain embodiments of the disclosure.

In step S1 the terminal device and network access node determine there is data to be transmitted from the terminal device to the network access node using a series of repeat transmissions associated with the data. The reason why the data has become available for transmission and the content of the data are not significant to the principles described herein. For example, the terminal device may be running an application that requests the data is uploaded, and the terminal device may thus inform the network access node of the desire to transmit the data, or the network access node itself may instruct the terminal device to upload the data, for example a measurement report or in response to a request received from elsewhere, e.g. a server associated with an application running on the terminal device. It may further be determined the data should be transmitted using a series of repeat transmissions because the terminal device is operating in a poor coverage area and so should operate in accordance with a coverage enhancement mode of operation supported by the wireless telecommunications system. More generally, step S1 may be performed in accordance with conventional techniques.

In step S2 the network access node determines an initial arrangement of the transmission resources for the terminal device to use for transmitting the series of repeat transmissions for the data. The initial arrangement may, for example, comprise a pattern of radio resources in the time and frequency radio resource grid supporting the channel in which the data is to be transmitted along the lines represented in FIG. 2, i.e. comprising a series of repeat transmissions in a continuous series of timeslots with hopping between two frequencies after every four transmissions. As for step S1, step S2 may be performed in accordance with conventional techniques and having regard to conventional scheduling considerations in wireless telecommunications systems supporting repeat transmissions for coverage enhancement with frequency hopping.

In step S3 the network access node provides the terminal device with an indication of the initial arrangement. This step may also be performed in accordance with conventional techniques, for example having regard to established techniques for indicating resource allocations in a wireless telecommunications system supporting repeat transmissions for coverage enhancement with frequency hopping.

In step S4 the terminal device begins transmitting the series of repeat transmissions associated with the data to be transmitted to the network access node, and this may also be done in accordance with conventional techniques.

Thus, steps S1 to S4 may correspond with conventional approaches for initiating uplink transmissions of data in a wireless telecommunications system supporting repeat transmissions for coverage enhancement.

However, the approach represented in FIG. 4 departs from conventional approaches in step S5 in which the network access node determines, while the transmission of the series of repeat transmissions associated with the data for transmission from the terminal device to the network access node is still ongoing (i.e. while there are some repeat transmissions that remain to be made), that the initial arrangement of transmission resources which is currently being used by the terminal device is no longer appropriate and should be modified. The network access node may, for example, determine this based on estimates of radio channel conditions associated with the transmission resources corresponding to the initial arrangement. The estimates of radio channel conditions may be based on conventional approaches for estimating channel conditions, for example based on a received signal quality (e.g. based on uplink reference signalling) or power of transmissions from the terminal device, or measurement reports in respect of downlink signalling received by the terminal device, for example downlink reference signals in a time-division duplex implementation when there is channel reciprocity. For example, if the initial arrangement comprises a series of repeat transmissions hopping between a first frequency, f1, and a second frequency, f2, and the network access node determines in step S5 that radio channel conditions associated with f1 have fallen below an acceptable threshold quality, the network access node may determine a modified arrangement should be used for at least some of the remaining repeat transmissions which does not include radio resources on frequency f1. More generally, in step S5 the network access node may establish a modified arrangement to use for at least some of the remaining repeat transmissions having regard to similar considerations to those used for determining the initial arrangement in step S2, but further taking account of the reason why the initial arrangement is no longer considered appropriate (e.g. taking account of changes in radio channel conditions). It will be appreciated there are other reasons why the network access node may determine that the initial arrangement of transmission resources should be modified which might not relate to changes in the radio channel conditions associated with the initial arrangement of transmission resources. For example, in some implementations the network access node may simply determine that resources previously allocated to the terminal device in accordance with the initial arrangement are now needed for another reason, for example to support higher priority transmissions for a different terminal device.

In step S6 the base station (network access node) transmits signalling to the terminal device to indicate the modified arrangement of transmission resources to use for (at least some of) the remaining repeat transmissions. This signalling may be referred to as arrangement change indicator signalling or, as noted above, a frequency hopping pattern change indicator, FHC.

In step S7, the terminal device establishes the modified arrangement of transmission resources should be used for transmitting at least some of the remaining repeat transmissions (in this example from the signalling received in step S6), and proceeds to start transmitting remaining repeat transmissions to the network access node using transmission resources in accordance with the modified arrangement.

Thus the approach represented in FIG. 4 allows an initial arrangement of radio resources allocated for use by a terminal device for transmitting a series of repeat transmissions associated with data to be transmitted from the terminal device to a network access node to be dynamically modified during the transmission of the series of repeat transmissions.

It will be appreciated a modified arrangement may itself be further modified before the transmission of the series of repeat transmissions is complete (e.g. by changing to another arrangement which is different from the initial arrangement or by changing back to the initial arrangement), for example because of further changes in radio channel conditions or because the modified arrangement is configured for use for a predetermined period that is not sufficient to complete the series of repeat transmissions. Accordingly, steps corresponding to steps S5, S6 and S7 in FIG. 4 may in effect be repeated multiple times before the transmission of a series of repeat transmissions is completed, whereby in each subsequent iteration of step S5 it is determined the current arrangement (as opposed to the initial arrangement as in the first iteration) should be modified.

It will further be appreciated there are many different ways in which an arrangement of resources allocated for use by a terminal device to transmit a series of repeat transmissions may be modified (both for the initial arrangement and an already modified arrangement which is to be further modified), for example having regard to the situation at hand in terms of what radio resources are associated with relatively good and/or relatively poor channel conditions, or what previously-allocated radio resources may subsequently need to be used to support a different higher priority service.

In some cases the initial arrangement of resources may include transmissions on one or more frequencies which are not used for transmissions in accordance with the modified arrangement (e.g. to avoid using resources associated with relatively poor channel conditions).

In some cases the modified arrangement of resources may include transmissions on one or more frequencies which are not used for transmissions in accordance with the initial arrangement (e.g. to make use of resources associated with relatively good channel conditions).

In some cases the initial arrangement of resources may include transmissions in one or more time slots which are not used for transmissions in accordance with the modified arrangement (e.g. to avoid using resources at times that are currently associated with relatively poor channel conditions, whereas the modified arrangement allows transmission on those resources at a future time in the expectation that the channel conditions may improve). The repeat transmissions from the initial arrangement which are skipped/missed in the modified arrangement may be replaced by repeat transmissions at a later time (so that in effect these transmissions are delayed), or may be missed altogether so that the overall series of repeat transmissions comprises a fewer number of repeat transmissions than set out in the initial arrangement.

In some cases the modified arrangement of resources may include transmissions in one or more time slots which are not used for transmissions in accordance with the initial arrangement (e.g. to replace transmissions that are missed to avoid using resources at times associated with relatively poor channel conditions, or to increase the total number of transmissions to provide for increased likelihood of successful decoding when transmissions are made on radio resources associated with relatively poor channel conditions).

In some cases the initial arrangement and/or the modified arrangement may include transmissions on only one frequency. For example, an initial arrangement may include a first frequency and a second frequency with frequency hopping, and if the first frequency is determined to be associated with relatively poor channel conditions, a modified arrangement which only uses the second frequency may be adopted. In this case transmissions scheduled for the first frequency in the initial arrangement may instead be made on the second frequency or missed altogether in the modified arrangement. Conversely, an initial arrangement may include transmissions on only a single frequency, for example because there were no other frequencies available to use when the initial arrangement was established, but the modified arrangement may introduce additional frequencies, for example to take advantage of frequency hopping if more frequencies become available for use during an ongoing series of repeat transmissions, or if it is determined that the transmission on the initial single frequency is unreliable. Furthermore, in some implementations the initial arrangement and the modified arrangement may both include a single frequency. In this case the modified arrangement may represent a change of the single frequency used for the transmissions according to the two arrangements, or the modified arrangement may be associated with transmissions on the same frequency as the initial arrangement, but delayed in time (to avoid transmissions during periods of poor channel conditions).

Having set out some of the general principles according to certain embodiments of the disclosure, some specific example implementations will now be described with reference to FIGS. 5 to 7.

Figure 5:
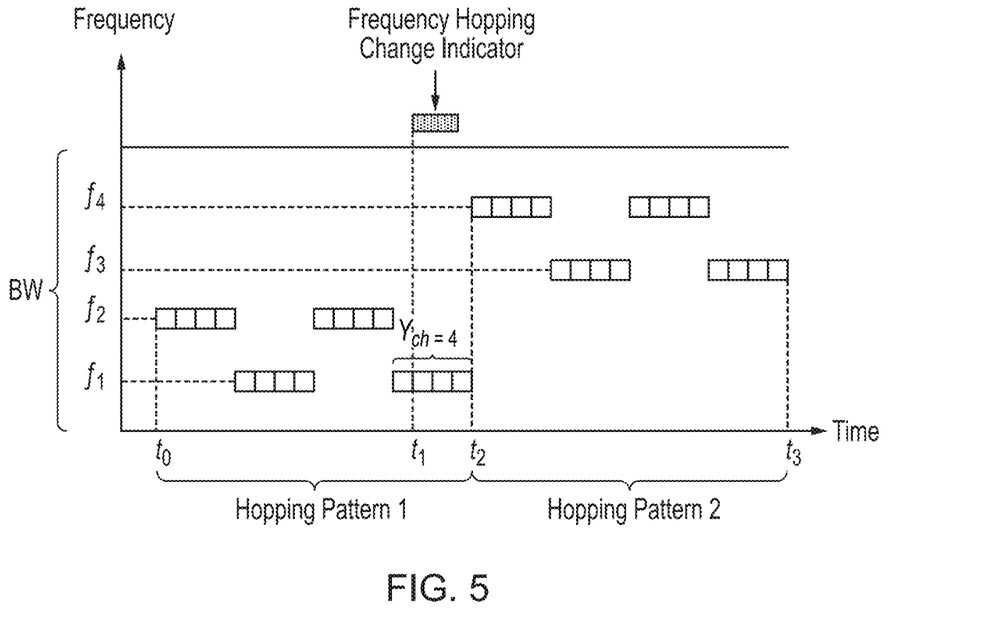
FIGS. 5 to 8 schematically represent example arrangements of radio resources in a time and frequency radio resource grid used to support transmissions of multiple repeats of a block of data to enhance coverage in accordance with some example embodiments of the disclosure.

FIG. 5 schematically represents an example arrangement of radio resources in a time and frequency radio resource grid used for uplink transmission of a series of repeats associated with the transmission of data from a terminal device to a network access node according to certain embodiments of the disclosure. Various aspects of FIG. 5 are similar to, and will be understood from, corresponding aspects of FIG. 2 discussed above. Thus, the radio resource grid extends in time in the horizontal direction and frequency in the vertical direction and spans the uplink operating bandwidth BW for the relevant channel (e.g. PUSCH in an LTE example) in the wireless telecommunications system. Each of the transmissions comprising the repeating series of repeat transmissions is represented in FIG. 5 as a shaded box.

For the example shown in FIG. 5, it is assumed an uplink transmission of data on a PUSCH channel is transmitted from a terminal device to a network access node with 32 repetitions using frequency hopping staring at time t0. The PUSCH transmission (i.e. the series of repeat transmissions) starts off with an initial frequency hopping pattern (initial arrangement of transmission resources) indicated as Hopping Pattern 1 in FIG. 5. In accordance with Hopping Pattern 1 the repeat transmissions are hopped over two frequencies, f1 and f2, with a frequency hop performed after every 4 repetitions, i.e., Ych=4 (it will be appreciated this specific example pattern/arrangement is merely one specific concrete example used to aid explanation, and the same principles may be applied for other patterns/arrangements, for example comprising different numbers of repeats and numbers of repeats before hopping and different frequencies). It may be noted in this example, and the other examples represented in the figures, the terminal device is assumed to have full duplex capability and can receive the FHC while also transmitting uplink repeat transmissions. In examples in which a terminal device has half duplex capability and cannot receive the FHC while also transmitting uplink repeat transmissions, the timings in the figures will be delayed.

At time t1, and in accordance with the principles described herein, a FHC (arrangement change indicator signalling) Is transmitted to the terminal device from the network access node, where the FHC instructs the terminal device to change its frequency hopping pattern to Hopping Pattern 2. In this example the terminal device is configured to continue transmissions according to the initial arrangement (Hopping Pattern 1) until the time of the next frequency hop according to Hopping Pattern 1, which is at time t2. Thus, the terminal device then changes to Hopping Pattern 2 (modified arrangement) at time t2, where in this example it hops between frequencies f3 and f4. In the example represented in FIG. 5 the terminal device proceeds to complete the series of 32 repeat transmissions in accordance with the modified arrangement.

Thus in the example of FIG. 5, the initial arrangement comprises frequency hopping between f1 and f2, and the modified arrangement comprises transmissions at the same times as would have been made according to the initial arrangement had it not been modified, but with frequency hopping between f3 and f4. This may be done, for example, because the network access node determined radio channel condition on f1 and/or f2 have deteriorated so that a change in frequency for remaining repeat transmissions should be made. In this example both frequencies are changed, but in other cases only one frequency might be changed. That is to say, if the initial hopping pattern hops between f1 and f2, then one or both of these frequencies may be changed. Thus a modified hopping pattern may comprise hopping between f2 and f3 (or f4) (e.g. if f1 becomes associated with poor channel conditions), or hopping between f1 and f3 (or f4) (e.g. if f2 becomes associated with poor channel conditions), or, as shown in FIG. 5, hopping between f3 and f4 (e.g. if f1 and f2 both become associated with poor channel conditions, or if frequency hopping is restricted to predefined pairs of frequencies so that both are changed even if only one becomes associated with poor channel conditions).

In one example the change in frequency hopping pattern may comprise changing one of the hopped frequencies in the initial arrangement to the other hopped frequency. E.g. if the PUSCH transmission according to the initial arrangement/hopping pattern is frequency hopped between f1 and f2, the FHC indicator may indicate that f1 is in effect to be changed to f2 for the modified arrangement, in which case the terminal device would then start transmitting repeat transmissions that remain to be made using only 2.

Figure 6:
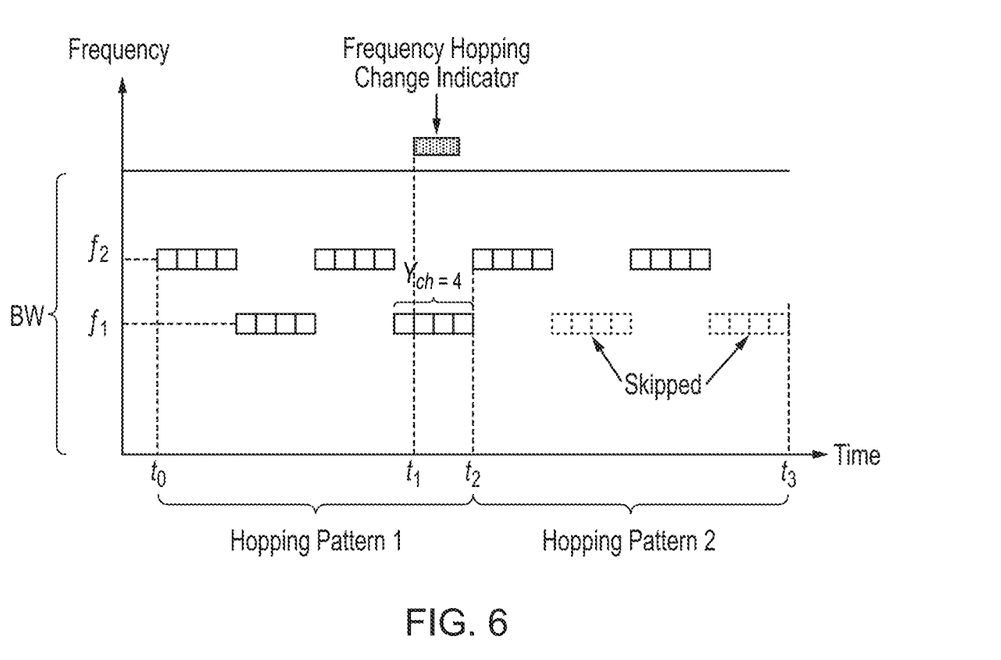

In another embodiment, the modified arrangement may comprise skipping transmissions on at least one of the hopped frequencies, for example as represented in FIG. 6. FIG. 6 is similar to, and will be understood from FIG. 5, but represents another example modified arrangement. As for the example represented in FIG. 5, it is assumed for FIG. 6 an uplink transmission of data on a PUSCH channel is initially scheduled for 32 repetitions using frequency hopping between f1 and f2 with Ych=4 (Hopping Pattern 1) starting at time t0. Also as in the example of FIG. 5, it is assumed for FIG. 6 that at time t1 a FHC (arrangement change indicator signalling) is transmitted to the terminal device from the network access node, where the FHC instructs the terminal device to change its frequency hopping pattern to Hopping Pattern 2 at its next scheduled frequency hop. Thus, the terminal device changes to Hopping Pattern 2 (modified arrangement) at time t2. However, whereas in FIG. 5 the modified arrangement comprises a switch to frequency hopping between f3 and f4, in the example of FIG. 6, the modified arrangement is such that the terminal device continues transmitting on frequency f2 as for the initial arrangement, but stops transmitting on frequency f1. This may be an appropriate modified arrangement when channel conditions on f1 are determined to be relatively poor for the terminal device. The terminal device is thus configured to stop using these resources, for example so they may be freed up for another use, but the terminal device is not allocated any replacement resources. In the example represented in FIG. 6 the terminal device proceeds to complete the series of repeat transmissions in accordance with the modified arrangement, and as such it will be recognised that the series of repeat transmissions made comprises fewer transmissions than were initially scheduled, in this case comprising 24 repeat transmissions because 8 are skipped. This may result in reduced likelihood of the data being successfully received by the network (compared to the case the network receives the full number of repeat transmissions with acceptable channel conditions), in which case a retransmission may be required. However, this approach may nonetheless be appropriate in some scenarios, for example if there are no other frequencies available for use by the terminal device, either because they are already allocated for use by other terminal devices, or simply because the wireless telecommunications systems is not configured to allow reallocation to different frequencies midway through a series of repeats to simplify scheduling. The skipping of transmissions at frequency f1 after t2 may save energy at the terminal device, since transmissions at that frequency are expected not to significantly contribute to the reliability of decoding at the base station.

In the examples discussed above with reference to FIGS. 5 and 6 it has been assumed the modified arrangement is used for the remainder of the repeat transmissions for the data (or until a further modification is desired because of further changes in radio channel conditions/need for the resources defined by the modified arrangement to be used for another higher priority use). However, in some examples the modified arrangement may be associated with a predefined validity period/expiry time so that once this period has expired, and assuming there are still some remaining repeat transmissions to be made for the series of repeat transmissions, the still remaining repeat transmissions are then made using resources according to the initial arrangement/hopping pattern. That is to say, after a predetermined period of time/number of repeat transmissions using the modified arrangement, there may be a reversion to the initial arrangement.

Figure 7:
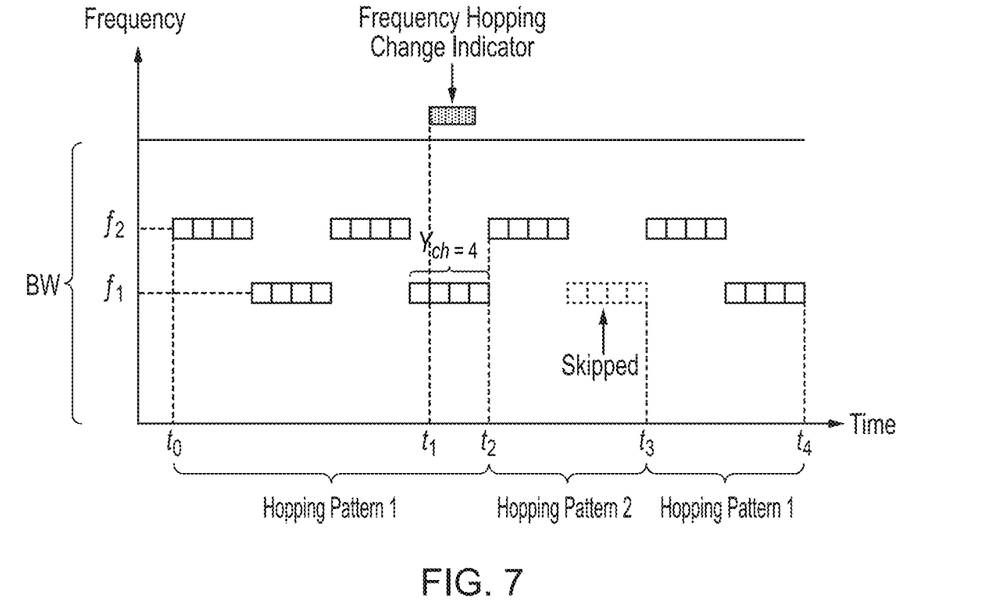

An example of this approach is represented in FIG. 7. FIG. 7 is similar to, and will be understood from, FIG. 6. However, the approach represented in FIG. 7 differs from the approach represented in FIG. 6 in that the modified arrangement (Hopping Pattern 2) is configured to apply only for a predetermined period of time, after which the repeat transmissions revert to the initial arrangement (Hopping Pattern 1). The predetermined period of time (validity period) for the modified arrangement may be indicated in the FHC signalling or maybe otherwise determined, for example in accordance with an operating standard of the wireless telecommunications system, or prior signalling, for example in system information broadcasts.

An appropriate value for the validity period may be selected, for example, having regard to the timescale over which poor channel conditions may be expected to improve. For example, the expiry time (validity period) may be a function of the characteristic speed of channel condition variations (channel coherence time). Thus, for a relatively slowly time varying channel, the expiry time may be correspondingly relatively large, whereas a relatively shorter expiry time may be applied for a channel that varies relatively more quickly. In the example represented in FIG. 7, it is assumed the validity period for the modified arrangement expires at time t3 (which in this example means it has a duration corresponding to the time taken to make 8 repeat transmissions).

Thus, as for the example represented in FIG. 6, it is assumed for FIG. 7 an uplink transmission of data on a PUSCH channel is initially scheduled for 32 repetitions using frequency hopping between f1 and f2 with Ych=4 (Hopping Pattern 1) starting from time t0. Also as in the example of FIGS. 5 and 6, it is assumed for FIG. 7 that at time t1 a FHC (arrangement change indicator signalling) is transmitted to the terminal device from the network access node, where the FHC instructs the terminal device to change its frequency hopping pattern to Hopping Pattern 2 at its next scheduled frequency hop. Thus, the terminal device changes to Hopping Pattern 2 (modified arrangement) at time t2. As in the example of FIG. 6 the modified arrangement of FIG. 7 is such that the terminal device continues transmitting on frequency f2 as for the initial arrangement, but skips transmissions on frequency f1. However, whereas the modified arrangement of FIG. 6 (i.e. skipping transmissions on f1) continues for the remainder of the repeat transmissions (or until it is further modified by another FHC received from the access node), in the example of FIG. 7, the modified arrangement according to Hopping Pattern 2 (skipping of transmissions on f1) continues only until time t3, after which transmissions are made in accordance with the initial arrangement, i.e. Hopping Pattern 1 comprising frequency hopping between f1 and f2 as discussed above. A time-limited modified arrangement may be appropriate when it is expected channel conditions will improve before transmissions of the repeat transmissions are complete. The terminal device in the approach of FIG. 7 is thus configured to stop using resources on f1 for a period of time, for example so they may be freed up for another use and to help avoid energy wastage by the terminal device. The terminal device in this example is not allocated any replacement resources to make up for the skipped transmissions, and as such the overall series of repeat transmissions made comprises fewer transmissions than were initially scheduled according to the initial arrangement of 32 repeats, in this example there are 28 repeat transmissions because 4 are skipped. As for the approach of FIG. 6, this may result in reduced likelihood of the data being successfully received by the network so that a retransmission is required, but the time-limited duration of the modified arrangement comprising skipped transmissions in the approach of FIG. 7 can help make this less likely than for the approach of FIG. 6. In some implementations along the lines represented in FIG. 7, the reversion to the initial frequency hopped arrangement at T3 can allow the base station (network access node) to measure the channel quality on both frequencies f1 and f2 in order to help determine the best arrangement for any further modified arrangement that is communicated to the terminal device, for example, if there were still repeats to be made after time T4.

The behaviours that can be applied at the end of the FHC expiry time may be different in different implementations. For example, and as schematically represented in FIG. 7, the terminal device may revert to the original frequency hopping pattern for the remaining number of repeat transmissions (or until another FHC is received to modify this). Alternatively, the terminal device may revert to the original frequency hopping pattern for a predetermined number of repeat transmissions before again reverting to the modified arrangement. This provides an approach in which measurements on a frequency which is not used in accordance with the modified arrangement can be made to allow the network access node to determine whether the terminal device can be reconfigured, e.g. through sending another FHC, to use that frequency on a longer-term basis.

Figure 8:
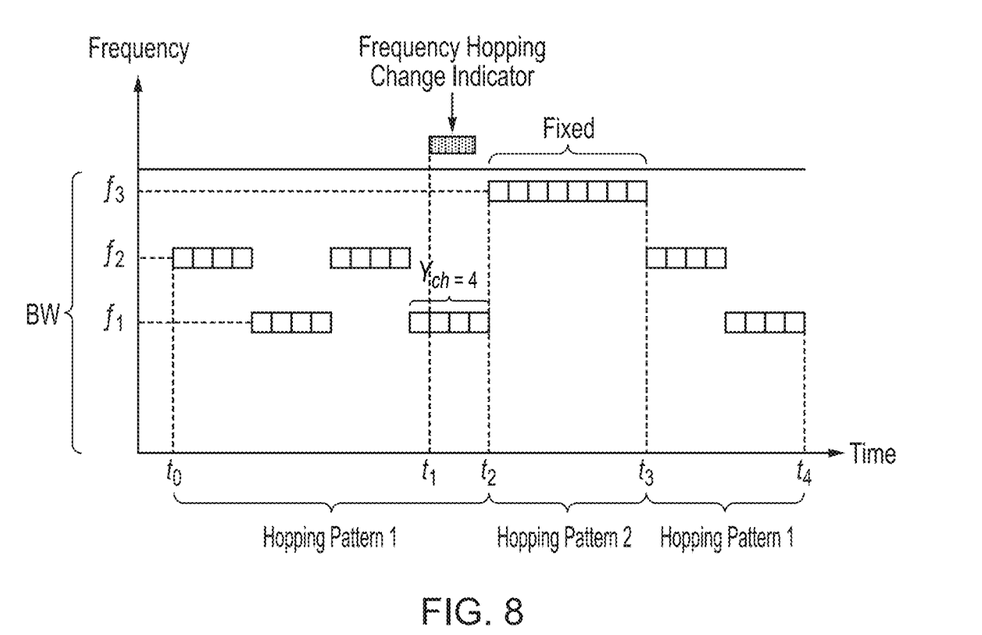

FIG. 8 is similar to, and will be understood from, FIG. 7. However, the approach represented in FIG. 8 differs from the approach represented in FIG. 7 in that a different modified arrangement (Hopping Pattern 2) is used for the predetermined period of time between t2 and t3. In particular, rather than continue transmissions as for the initial arrangement on f2 and skip transmissions on f1 as in FIG. 7, in FIG. 8 all the repeat transmissions initially scheduled to occur between t2 and 3 according to the initial arrangement are instead made on a single frequency f3 (i.e. the FHC is in effect used to temporarily deactivate frequency hopping). In the example represented in FIG. 8, frequency f3 is different from f1 and f2, but in a variation on this approach f3 may in some cases be the same as f1 or f2 if only one of them is determined to be associated with relatively poor channel conditions. More generally, any approach for modifying an arrangement of radio resources to use for repeat transmissions may be applied for a time-limited period in accordance with the approaches discussed above with reference to FIGS. 7 and 8.

As already noted elsewhere, in accordance with certain embodiments of the disclosure an approach for modifying an arrangement of transmission resources to be used for repeat transmissions may be used in situations that do not use frequency hopping. In this case the modified arrangement may result in the terminal device skipping transmissions for a period of time, which may, for example, be indicated to the terminal device in signalling received from the network access node or derived in another way, for example from an operating standard for the wireless telecommunications system. The skipped transmissions may be missed entirely or may be replaced by transmissions at a later time. This approach may, for example, help a terminal device that does not use frequency hopping nonetheless avoid wasting resources (e.g. battery power) by making transmissions when in deep fade. Another way to view this aspect of certain embodiments of the disclosure is the series of repeat transmission may in fact be paused for a period of time (regardless of whether or not frequency hopping is used) and restarted again after a timer expires.

In accordance with some example implementations the network access node may determine whether or not a modified arrangement should be used based on measurements of radio channel conditions associated with received PUSCH signalling for radio resources associated with the initial arrangement, and these measurements may also be used to determine characteristics of the modified arrangement (e.g. which of the frequencies may still be used because they are associated with good channel conditions). For example, if a terminal device is frequency hopping between frequencies f1 and f2, the network access node may establish a characteristic indicator of channel quality from measurements associated with these transmissions, for example a measure of power received (such a characteristic indicator of channel quality may be established in accordance with conventional techniques for channel monitoring in wireless telecommunication systems). For example, suppose the network access node establishes that transmissions on frequency f1 are being received with power P1 and transmissions on frequency f2 are being received with power P2, the network access node may compare P1 and P2 and assess whether or not to configure a modified arrangement based on the following considerations:

(i) if abs(P1−P2)<a predefined threshold, the network access node may decide it is not necessary to configure a modified arrangement (ii) if P1>P2 by more than the predefined threshold, the network access node may decide a modified arrangement should be used and transmit an FHC to trigger the terminal device to start using a modified arrangement which avoids transmissions on f2 (e.g. by skipping/delaying the transmissions or making them on a different frequency)

(iii) If P1<P2 by more than the predefined threshold, the network access node may decide a modified arrangement should be used and transmit an FHC to trigger the terminal device to start using a modified arrangement which avoids transmissions on f1 (e.g. by skipping/delaying the transmissions or making them on a different frequency)

Of course it will be appreciated these are merely some examples, and various other considerations may be made. For example, even if P1 and P2 are similar, the network access node may decide to configure a modified arrangement if they are both less than a predefined threshold value corresponding to a minimum acceptable level. In this case it may be expected the modified arrangement would avoid transmissions on both f1 and f2 (e.g. as in FIGS. 5 and 8).

In another example, if the terminal device is transmitting on a single frequency and the base station (network access node) determines the channel conditions on that single frequency are deteriorating, for example from performing autocorrelation functions on an aspect of the received single frequency, an FHC may be triggered to pause transmissions on that single frequency. The duration of the pause may be configured to correspond to a time associated with the coherence time of the channel.

The FHC indicator may be communicated to the terminal device in various ways. For example, in some cases the signalling indicating a modified arrangement should be used may be received in association with downlink control information, DC, received from the network access node. For example, the downlink control information may comprise acknowledgement signalling received in relation to a transmission of the series of repeat transmissions, or the downlink control information may comprise allocation signalling scheduling a retransmission of the data.

The DCI carrying the FHC may in some cases be transmitted during the repetition of a PUSCH or PDSCH transmission. For example a terminal device transmitting PUSCH repetitions in a frequency division duplex, FDD, operating mode may be configured to monitor for the DCI carrying FHC according to a configured periodicity, for example corresponding to the length Ych so the scheduler in the network access node may change the frequency hopping pattern at any hop point.

In some example implementations, an initial arrangement of resources to use for transmitting repeat transmissions may include a period of time during which the terminal device does not transmit repeat transmissions of the data to the network access node (e.g. In an Uplink Compensation Gap) and the FHC (arrangement change indicator signalling) may be received from the network access node during this period. This may be appropriate, for example, for a terminal device operating in a half-duplex operating mode (i.e. a terminal device which may not be able to receive downlink signalling while it is transmitting).

In some example implementations, the FHC (arrangement change indicator signalling) may comprise a predefined signature sequence and/or may be communicated on a dedicated physical channel (i.e. a new physical channel). Whereas in eMTC (enhanced MTC scenarios), physical layer signalling from the base station (network access node) to the terminal device consists of DCI transmitted on an MPDCCH, where a DCI consists of in the region of 8-30 bits protected by a 16 bit CRC, the dedicated physical channel may consist of single FHC bits transmitted using known bits locations within a bit string transmitted to one or more terminal devices, transmitted in a known set of subcarriers or transmitted using a known correlation sequence. The FCH bits may be transmitted using control channel elements, within the MPDCCH search space, that are not aggregated into MPDCCH.

It will be appreciated there are various modifications to the approach described above that may be adopted in different implementations.

For example, in some implementations the modified arrangement may be derivable from the initial arrangement according to a predefined scheme. For example, if an initial arrangement comprises transmissions on frequencies f1 and f2 and it is determined these should be changed (for example because of poor channel conditions on one or other frequency), in some implementations there may be a simple rule that in these circumstances the change should be to a different predefined arrangement. In a simple case there may only be two different arrangements available to a terminal device and the terminal device may simply switch from one to the other when it is determined there should be a modification to the initial arrangement. In other cases the modified arrangement may be derivable from the initial arrangement. For example, the terminal device and network access node may be configured to modify an initial arrangement by adding a predefined frequency offset to the frequencies used in the initial arrangement. Furthermore, it will be appreciated that in some cases this may be applied in respect of all frequencies, or only those frequencies for which it is determined a change is needed. In cases where the modified arrangement is predefined or otherwise derivable from the initial arrangement, the signalling at step S6 in FIG. 4 may simply comprise a simple one bit indicator to indicate the change from the initial arrangement to the modified arrangement should be applied (i.e. it is not necessary for the signalling in step S6 to include an indication of the actual modified arrangement). In cases where the signalling in step S6 does include an indication of the modified arrangement, this may comprise an indication of the specific frequencies and timings to use for the new arrangement, or a pointer/index identifying one of a number of different predefined arrangements. More generally, it will be appreciated the specific manner in which the nature of the modification to the arrangement of transmission resources is established is not significant to the principles described herein.

Furthermore, whereas in the example approaches described above with reference to FIG. 4 the network access node may provide the terminal device with explicit signalling to indicate the change from the initial arrangement to the modified arrangement, in other example implementations a terminal device may be operable to autonomously establish there should be a change to the modified arrangement without receiving specific signalling from the network access mode to indicate this. For example, the terminal device and the network access node may in some cases be configured to autonomously change to a modified arrangement of transmission resources if a predefined condition known to both the terminal device and the network access node is met in respect of transmissions being made using the initial arrangement. For example, the terminal device and network access node may be configured to change to using a modified arrangement to communicate remaining repeat transmission if an amount of negative acknowledgement signalling (NACK signalling) associated with previously sent repeat transmissions exceeds a predefined threshold amount. In such approaches the modified arrangement may, for example, be derivable from the initial arrangement, e.g. in a manner along the lines discussed above.

It will also be appreciated that while the above examples have focused on approaches in which a terminal device may be configured to use an arrangement (pattern) of transmission resources for repeat transmissions using one or two frequencies (i.e. no frequency hopping or frequency hopping between two frequencies), the same principles may be applied in respect of a terminal device that may be configured to use an arrangement of transmission resources using more frequencies (e.g. frequency hopping among three or more frequencies). That is to say, what is significant is not any specific restrictions on what arrangements/patterns may be configured for use for transmitting a series of repeat transmissions, but that the arrangement/pattern can be changed while the transmission of the series of repeat transmissions is ongoing (i.e. partway through).

Furthermore, while the embodiments disclosed above have primarily focused on supporting repeat transmissions in uplink (e.g. on PUSCH in LTE), similar principles can be applied in downlink (e.g. on PDSCH in LTE). For example, a network access node may configure a terminal device to receive a series of repeating downlink transmissions in accordance with a first arrangement of transmission resources, but then determine this arrangement should be modified (e.g. based on measurement reports received from the terminal device), and so transmit an indicator to the terminal device to indicate the change in the initial arrangement of scheduled PDSCH resources for the downlink repeat transmissions to a modified arrangement of PDSCH resources scheduled for the downlink repeat transmissions.

Thus there has been described a method of operating a first entity (e.g. a terminal device) in a wireless telecommunications system comprising the first entity and a second entity (e.g. a network access node), wherein the method comprises: determining there is data to be transmitted from the first entity to the second entity using a series of repeat transmissions for the data; establishing an initial arrangement of transmission resources from within a time and frequency transmission resource grid to be used for transmitting respective ones of the repeat transmissions from the first entity to the second entity; starting to transmit the series of repeat transmissions to the second entity using transmission resources according to the initial arrangement; establishing before the transmission of the series of repeat transmissions to the second entity is complete that a modified arrangement of transmission resources from within the time and frequency transmission resource grid should be used for transmitting at least some of the remaining repeat transmissions; and starting to transmit the at least some remaining repeat transmissions to the second entity using transmission resources in accordance with the modified arrangement.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a first entity in a wireless telecommunications system comprising the first entity and a second entity, wherein the method comprises: determining there is data to be transmitted from the first entity to the second entity using a series of repeat transmissions for the data; establishing an initial arrangement of transmission resources from within a time and frequency transmission resource grid to be used for transmitting respective ones of the repeat transmissions from the first entity to the second entity; starting to transmit the series of repeat transmissions to the second entity using transmission resources according to the initial arrangement; establishing before the transmission of the series of repeat transmissions to the second entity is complete that a modified arrangement of transmission resources from within the time and frequency transmission resource grid should be used for transmitting at least some of the remaining repeat transmissions; and starting to transmit the at least some remaining repeat transmissions to the second entity using transmission resources in accordance with the modified arrangement.

Paragraph 2. The method of paragraph 1, wherein the initial arrangement includes transmissions on one or more frequencies which are not used for transmissions in accordance with the modified arrangement.

Paragraph 3. The method of paragraph 1 or 2, wherein the modified arrangement includes transmissions on one or more frequencies which are not used for transmissions in accordance with the initial arrangement.

Paragraph 4. The method of any of paragraphs 1 to 3, wherein the initial arrangement includes transmissions in time slots which are not used for transmissions in accordance with the modified arrangement.

Paragraph 5. The method of any of paragraphs 1 to 4, wherein the modified arrangement includes transmissions in time slots which are not used for transmissions in accordance with the initial arrangement.

Paragraph 6. The method of any of paragraphs 1 to 5, wherein the modified arrangement includes transmissions on only one frequency.

Paragraph 7. The method of any of paragraphs 1 to 6, wherein the initial arrangement includes transmissions on only one frequency.

Paragraph 8. The method of any of paragraphs 1 to 7, wherein using the modified arrangement to transmit at least some of the repeat transmission results in the series of repeat transmissions transmitted by the first entity to the second entity comprising a different number of repeat transmissions than would be the case of the complete series of repeat transmissions had been transmitted in accordance with the initial arrangement.

Paragraph 9. The method of any of paragraphs 1 to 8, wherein establishing that a modified arrangement of transmission resources should be used for transmitting at least some of the remaining repeat transmissions comprises receiving arrangement change indicator signalling from the second entity which indicates that a modified arrangement of transmission resources should be used for transmitting at least some of the remaining repeat transmissions.

Paragraph 10. The method of paragraph 9, wherein the arrangement change indicator signalling further comprises an indication of the modified arrangement of transmission resources.

Paragraph 11. The method of paragraph 9 or 10, wherein the arrangement change indicator signalling comprises a predefined signature sequence Paragraph 12. The method of any of paragraphs 9 to 11, wherein the arrangement change indicator signalling is received in association with downlink control information received from the second entity.

Paragraph 13. The method of paragraph 12, wherein the downlink control information comprises acknowledgement signalling received in relation to a transmission of the series of repeat transmissions, or wherein the downlink control information comprises allocation signalling scheduling a retransmission of the data.

Paragraph 14. The method of any of paragraphs 9 to 13, wherein the arrangement change indicator signaling is received on a dedicated physical channel dedicated for arrangement change indicator signalling.

Paragraph 15. The method of any of paragraphs 9 to 14, wherein the initial arrangement includes a period of time during which the first entity does not transmit repeat transmissions of the data to the second entity and the arrangement change indicator signalling is received from the second entity during this period.

Paragraph 16. The method of any of paragraphs 1 to 15, further comprising establishing a period of time during which to transmit the at least some remaining repeat transmissions to the second entity using transmission resources in accordance with the modified arrangement, and after that period of time, starting to transmit at least some of any still remaining repeat transmissions using transmission resources according to the initial arrangement.

Paragraph 17. The method of paragraph 16, further comprising establishing a period of time during which to transmit the at least some of any still remaining repeat transmissions using transmission resources according to the initial arrangement, and after that period of time, starting to transmit at least some of any yet still remaining repeat transmissions using transmission resources according to the modified arrangement.

Paragraph 18. The method of any of paragraphs 1 to 17, further comprising establishing before the transmission of the series of repeat transmissions to the second entity is complete that a further modified arrangement of transmission resources from within the time and frequency transmission resource grid should be used for transmitting at least some of the remaining repeat transmissions; and starting to transmit the at least some remaining repeat transmissions to the second entity using transmission resources in accordance with the further modified arrangement.

Paragraph 19. The method of paragraph 18, when the further modified arrangement matches the initial arrangement.

Paragraph 20. The method of any of paragraphs 1 to 19, wherein the first entity is a terminal device and the second entity is a network access node.

Paragraph 21. A first entity for use in a wireless telecommunications system comprising the first entity and a second entity, wherein the first entity comprises controller circuitry and transceiver circuitry configured to operate together such that the first entity is operable to: determine there is data to be transmitted from the first entity to the second entity using a series of repeat transmissions associated with the data; establish an initial arrangement of transmission resources from within a time and frequency transmission resource grid to be used for transmitting respective ones of the repeat transmissions from the first entity to the second entity; start to transmit the series of repeat transmissions to the second entity using transmission resources according to the initial arrangement; establish before the transmission of the series of repeat transmissions to the second entity is complete that a modified arrangement of transmission resources from within the time and frequency transmission resource grid should be used for transmitting at least some of the remaining repeat transmissions; and start to transmit the at least some remaining repeat transmissions to the second entity using transmission resources in accordance with the modified arrangement.

Paragraph 22. Circuitry for a first entity for use in a wireless telecommunications system comprising the first entity and a second entity, wherein the circuitry comprises controller circuitry and transceiver circuitry configured to operate together such that the circuitry is operable to: determine there is data to be transmitted from the first entity to the second entity using a series of repeat transmissions associated with the data; establish an initial arrangement of transmission resources from within a time and frequency transmission resource grid to be used for transmitting respective ones of the repeat transmissions from the first entity to the second entity; start to transmit the series of repeat transmissions to the second entity using transmission resources according to the initial arrangement; establish before the transmission of the series of repeat transmissions to the second entity is complete that a modified arrangement of transmission resources from within the time and frequency transmission resource grid should be used for transmitting at least some of the remaining repeat transmissions; and start to transmit the at least some remaining repeat transmissions to the second entity using transmission resources in accordance with the modified arrangement.

Paragraph 23. A method of operating a second entity in a wireless telecommunications system comprising the second entity and a first entity, wherein the method comprises: determining there is data to be received by the second entity from the first entity using a series of repeat transmissions associated with the data; establishing an initial arrangement of transmission resources from within a time and frequency transmission resource grid to be used by the first entity for transmitting respective ones of the repeat transmissions to the second entity; starting to receive the series of repeat transmissions from the first entity using transmission resources according to the initial arrangement; establishing before the transmission of the series of repeat transmissions by the first entity is complete that a modified arrangement of transmission resources from within the time and frequency transmission resource grid should be used by the first entity for transmitting at least some of the remaining repeat transmissions; and starting to receive the at least some remaining repeat transmissions from the first entity using transmission resources in accordance with the modified arrangement.

Paragraph 24. The method of paragraph 23, wherein establishing that a modified arrangement of transmission resources should be used by the first entity for transmitting at least some of the remaining repeat transmissions is based on measurements of radio channel conditions associated with the transmissions from the first entity using transmission resources according to the initial arrangement Paragraph 25. A second entity for use in a wireless telecommunications system comprising the second entity and a first entity, wherein the second entity comprises controller circuitry and transceiver circuitry configured to operate together such that the second entity is operable to: determine there is data to be received by the second entity from the first entity using a series of repeat transmissions associated with the data; establish an initial arrangement of transmission resources from within a time and frequency transmission resource grid to be used by the first entity for transmitting respective ones of the repeat transmissions to the second entity; start to receive the series of repeat transmissions from the first entity using transmission resources according to the initial arrangement; establish before the transmission of the series of repeat transmissions by the first entity is complete that a modified arrangement of transmission resources from within the time and frequency transmission resource grid should be used by the first entity for transmitting at least some of the remaining repeat transmissions; and start to receive the at least some remaining repeat transmissions from the first entity using transmission resources in accordance with the modified arrangement.

Paragraph 26. Circuitry for a second entity for use in a wireless telecommunications system comprising the second entity and a first entity, wherein the circuitry comprises controller circuitry and transceiver circuitry configured to operate together such that the circuitry is operable to: determine there is data to be received by the second entity from the first entity using a series of repeat transmissions associated with the data; establish an initial arrangement of transmission resources from within a time and frequency transmission resource grid to be used by the first entity for transmitting respective ones of the repeat transmissions to the second entity; start to receive the series of repeat transmissions from the first entity using transmission resources according to the initial arrangement; establish before the transmission of the series of repeat transmissions by the first entity is complete that a modified arrangement of transmission resources from within the time and frequency transmission resource grid should be used by the first entity for transmitting at least some of the remaining repeat transmissions; and start to receive the at least some remaining repeat transmissions from the first entity using transmission resources in accordance with the modified arrangement.

REFERENCES

[1] RP-161464, "Revised WID for Further Enhanced MTC for LTE," Ericsson, 3GPP TSG RAN Meeting #73, New Orleans, USA, Sep. 19-22, 2016

[2] RP-161901, "Revised work item proposal: Enhancements of NB-IoT", Huawei, HiSilicon, 3GPP TSG RAN Meeting #73, New Orleans, USA. Sep. 19-22, 2016
[3] RP-170732. "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009

The invention claimed is:

1. A method of operating a first entity in a wireless telecommunications system comprising the first entity and a second entity, wherein the method comprises:
starting to transmit a series of repeat transmissions to the second entity using transmission resources according to an initial arrangement;
establishing before the transmission of the series of repeat transmissions to the second entity is complete that, based on radio channel conditions of the initial arrangement falling below an acceptable threshold quality, a modified arrangement of transmission resources from within a time and frequency transmission resource grid is used for transmitting at least some of the remaining repeat transmissions; and
starting to transmit the at least some remaining repeat transmissions to the second entity using transmission resources in accordance with the modified arrangement.

2. The method of claim 1, wherein the initial arrangement includes transmissions on one or more frequencies which are not used for transmissions in accordance with the modified arrangement.

3. The method of claim 1, wherein the modified arrangement includes transmissions on one or more frequencies which are not used for transmissions in accordance with the initial arrangement.

4. The method of claim 1, wherein the initial arrangement includes transmissions in time slots which are not used for transmissions in accordance with the modified arrangement.

5. The method of claim 1, wherein the modified arrangement includes transmissions in time slots which are not used for transmissions in accordance with the initial arrangement.

6. The method of claim 1, wherein the modified arrangement includes transmissions on only one frequency.

7. The method of claim 1, wherein the initial arrangement includes transmissions on only one frequency.

8. The method of claim 1, wherein using the modified arrangement to transmit at least some of the repeat transmission results in the series of repeat transmissions transmitted by the first entity to the second entity comprising a different number of repeat transmissions than would be the case of the complete series of repeat transmissions had been transmitted in accordance with the initial arrangement.

9. The method of claim 1, wherein establishing that a modified arrangement of transmission resources should be used for transmitting at least some of the remaining repeat transmissions comprises receiving arrangement change indicator signalling from the second entity which indicates that a modified arrangement of transmission resources should be used for transmitting at least some of the remaining repeat transmissions.

10. The method of claim 9, wherein the arrangement change indicator signalling further comprises an indication of the modified arrangement of transmission resources.

11. The method of claim 9, wherein the arrangement change indicator signalling comprises a predefined signature sequence.

12. The method of claim 9, wherein the arrangement change indicator signalling is received in association with downlink control information received from the second entity.

13. The method of claim 12, wherein the downlink control information comprises acknowledgement signalling received in relation to a transmission of the series of repeat transmissions, or wherein the downlink control information comprises allocation signalling scheduling a retransmission of the data.

14. The method of claim 9, wherein the arrangement change indicator signalling is received on a dedicated physical channel dedicated for arrangement change indicator signalling.

15. The method of claim 9, wherein the initial arrangement includes a period of time dun rig which the first entity does not transmit repeat transmissions of the data to the second entity and the arrangement change indicator signalling is received from the second entity during this period.

16. The method of claim 1, further comprising establishing a period of time during which to transmit the at least some remaining repeat transmissions to the second entity using transmission resources in accordance with the modified arrangement, and after that period of time, starting to transmit at least some of any still remaining repeat transmissions using transmission resources according to the initial arrangement.

17. The method of claim 1, further comprising establishing before the transmission of the series of repeat transmissions to the second entity is complete that a further modified arrangement of transmission resources from within the time and frequency transmission resource grid should be used for transmitting at least some of the remaining repeat transmissions; and starting to transmit the at least some remaining repeat transmissions to the second entity using transmission resources in accordance with the further modified arrangement.

18. The method of claim 17, when the further modified arrangement matches the initial arrangement.

19. A method of operating a second entity in a wireless telecommunications system comprising the second entity and a first entity, wherein the method comprises:
starting to received series of repeat transmissions from the first entity using transmission resources according to an initial arrangement;
establishing before the transmission of the series of repeat transmissions by the first entity is complete that, based on radio channel conditions of the initial arrangement falling below an acceptable threshold quality, a modified arrangement of transmission resources from within a time and frequency transmission resource grid is used by the first entity for transmitting at least some of the remaining repeat transmissions; and
starting to receive the at least some remaining repeat transmissions from the first entity using transmission resources in accordance with the modified arrangement.

20. The method of claim 19, wherein establishing that a modified arrangement of transmission resources should be used by the first entity for transmitting at least some of the remaining repeat transmissions is based on measurements of radio channel conditions associated with the transmissions from the first entity using transmission resources according to the initial arrangement.

* * * * *